Conaty & Catt,
Corn Planter.
No. 113,018. Patented Mar. 28, 1871.
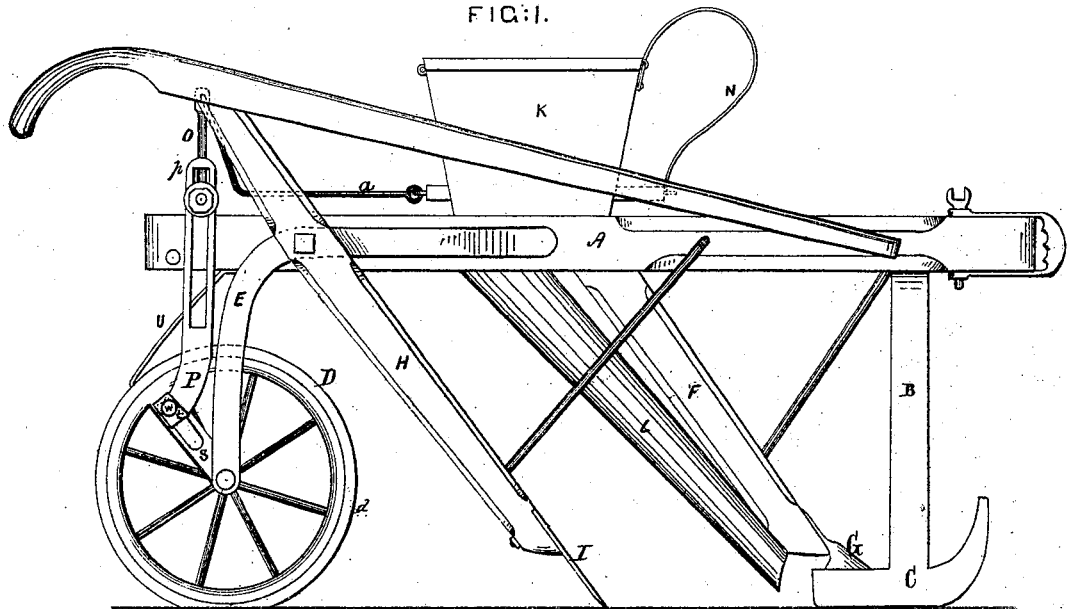
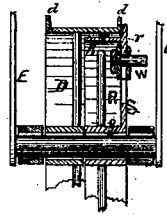
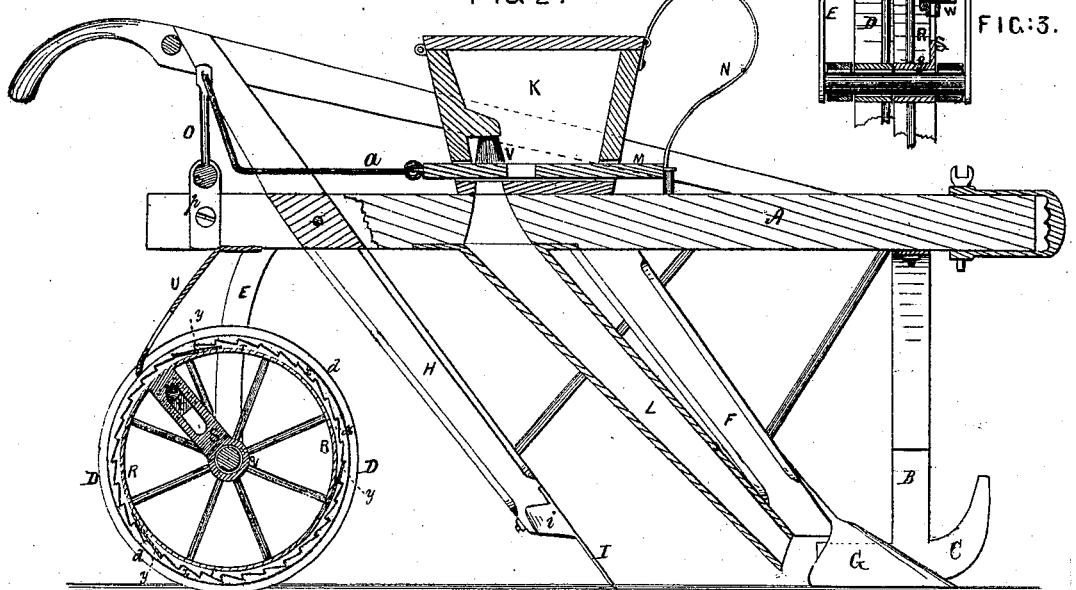
Witnesses:
H. H. Young
E. A. Dick
Inventors:
Milton Catt
and James B. Conaty
By David A. Burr atty.

United States Patent Office.

JAMES B. CONATY AND MILTON CATT, OF INDIANAPOLIS, INDIANA.

Letters Patent No. 113,018, dated March 28, 1871.

IMPROVEMENT IN CORN-PLANTERS.

The Schedule referred to in these Letters Patent and making part of the same.

We, JAMES B. CONATY and MILTON CATT, of Indianapolis, in the county of Marion and State of Indiana, have invented a new and useful Improvement in Corn-Planters, of which the following is a specification.

Nature and Objects of the Invention.

Our invention relates to an improved adjustment of the pin or tooth upon the main wheel of a corn-planter, by which the slide or dropping device in its seed-hopper is operated; and It consists in placing the pin or tooth upon a radial arm, which will admit of revolution upon the hub or axle of the wheel independently thereof, but which is provided with a catch or with a pawl, engaging a ratchet on the main wheel, to control its movement, the object of our invention being to furnish a complete and perfect automatic corn-planter, with which a field may be planted with accuracy without being first marked or laid off, and to accomplish this end by providing for an adjustment of the pin or tooth by which the dropping device is operated, so that the operator may cause the machine to commence planting at any point which he may select, and thus, in beginning a new row, or in starting anew after passing an obstruction in the course, by a simple movement of the pin, and without moving the machine, cause the planting to commence and continue in exact line with the hills already planted.

Our invention relates also to an adjustment both of the lever actuating the seed-dropper or slide and of the pin or tooth by which said lever is operated, for the purpose of determining the intervals between each movement of the dropping device, and consequently the distance between the plantings of corn in each row.

Description of the Accompanying Drawing.

Figure 1 is a side elevation of our improved corn-planter.

Figure 2, an irregular longitudinal vertical section through the radial arm carrying the operative pin or tooth, and through the seed-slide, &c.

Figure 3 is a radial section from the circumference of the wheel D to its axis, and continued through the axis, taken centrally through the radial arm S.

General Description.

A is the draft-beam.

B B, standards, dropping from a cross-bar upon the under side of its front end and terminating in sharp or narrow-edge runners C C, which serve to prevent a too deep penetration of the furrow-share, and to support in part the front end of the beam A.

I contemplate dividing these standards B B transversely, and so connecting the upper and lower portion as that the latter shall move up and down upon the former to permit of an adjustment of their length, the two being confined, when properly adjusted, by means of set-screws, bolts, or other devices.

D is a wheel, supporting the rear end of the beam A, and connected thereto by two arms or standards, E E, in whose lower ends bearings are formed for the ends of the axle of said wheel. This wheel D is made with a wide rim, provided on either edge with flanges d d, so as to serve as a roller in pressing down the earth upon the grain when planted.

F is the share-beam, carrying the share or point G, by which the furrow in which to plant the corn is opened.

H H are beams, carrying shares or points I I, of a peculiar shape, and provided with wings i, fig. 2, which operate to throw back and cover the furrow opened by the share G, the earth thus thrown back being pressed down by the wheel D.

K is the seed-hopper, of any approved form; and

L, its discharge-tube, extending to a point immediately in the rear of the share G.

The seed-hopper is provided with a slide, M, operating in the usual manner, to open the mouth of the discharge-tube L. The slide is actuated in one direction to close the discharge-opening by a spring, N, and in the other by a rock-lever, O, connected thereto by a suitable connecting-rod or link, a.

The journals of the shaft c, from which this lever O projects, are supported in the upper ends of plates p, fig. 2, secured to either side of the rear end of the beam A, over the wheel D, so as to project above the same.

P is a trip-lever, secured upon the projecting end of the rock-shaft c, and whose lower end reaches down below the rim of the wheel D. This lever is slotted longitudinally to receive the end of the rock-shaft c, which, projecting through the slot, is fitted with a nut and washer, by means whereof the lever is secured thereto. This slot permits the lower end of the lever to be elevated or depressed, or rather lengthened or shortened, at pleasure.

Upon the hub or the axle of the wheel D, on the same side thereof as said lever P, a loose collar, q, figs. 2 and 3, is fitted, forming the hub of a second wheel, R, whose rim r is inclosed by the broad projecting rim of the wheel D.

A plate, S, figs. 1, 2, and 3, extends radially from the collar or hub q to the rim r of the inner wheel R. This plate is slotted longitudinally, and a slide, t, is fitted to move in said slot, and secured at any desired point between the hub and rim by means of a set-screw or other suitable device. A pin or tooth, W, fig. 1, projects from said slide far enough to strike the end of the lever P in the revolution of the wheel, as illustrated in fig. 1.

Within the embracing-rim of the outer-wheel D a ratchet, $x$, is formed, to engage spring-pawls $y$, secured upon the rim of the inclosed wheel R, the teeth of the ratchet being so inclined (see fig. 2) as to permit an independent revolution of the wheel R upon the hub of the wheel D, as its axis, in the direction of the revolution of the wheel D when the machine is moving forward, but to prevent an independent movement thereof in the opposite direction.

U is a scraping attachment, projecting from the rear end of the beam down against the rim of the wheel D, to clear it of dirt which may clog or adhere thereto.

V is a brush, arranged within the hopper in the customary manner, to insure a prompt delivery of the seed.

With our machine, thus constructed, the corn placed in the hopper will, as the machine moves forward, be automatically delivered therefrom with regularity at points separated by equal distances. This is accomplished by means of the pin W, on the radial arm or plate of the wheel R, which is made to revolve in unison with the supporting-wheel D by the engagement of the spring-pawls $y$ $y$ with the ratchet $x$. This pin W, striking the lower end of the lever P at each revolution of the wheel, trips it, and thereby causes the rock-shaft $c$ to vibrate and draw back the seed-slide so that it will discharge the proper number of grains into the seed-tube L. The intervals between the discharges will be determined precisely by the circumference of the circle described by the pin W, which, if enlarged, will cause the pin W to strike the lever and operate the slide less frequently, and consequently drop the corn at longer intervals than where the circle is reduced. Hence, by moving the slide by which the pin W is secured to or from the center of the wheel D, the machine may be adjusted to plant the corn in hills at any distance apart which the farmer may desire. The slot in the lever P permits it to be adjusted in length to meet the pin W, as seen in fig. 1.

When the machine is in motion the corn will be dropped therefrom at precise and unvarying intervals, but when, because of any obstruction in the course, or other cause, its regular forward movement is interrupted, or when the machine is started in a new row, it is only necessary, after the dropping-tube L has been placed in line with the hill planted in the adjacent row, or slightly in advance thereof, to turn the pin W so as to bring it into contact with the lever P to cause the machine to continue planting in line with the hills already planted, as it moves forward, and thus insure with ease, and without any previous working or laying off of the ground, perfect regularity in all the rows in the field.

We contemplate applying our invention to all forms of corn-planters having a carrying or supporting-wheel.

Instead of using an entire wheel, R, to carry the pin W, as described, this pin may be arranged, substantially as described, upon a single radial arm, revolving about the hub or axis of the wheel D, and secured thereto at pleasure by a detachable fastening or catch, for the purpose herein set forth.

Two or more of our machines may be placed and worked side by side in a field, in which case it is advantageous to unite them by rigid connecting-beams.

Claims.

We claim as our invention—

1. A tooth or pin, revolving independently about the hub or axis of a wheel supporting the beam of a corn-planter, in combination with a lever operating the dropping device in the hopper thereof, when the revolution of said radial arm is controlled or arrested, substantially in the manner and for the purpose herein set forth.

2. The tooth or pin W, upon a slide working in a slot in the radial arm S, in combination with said arm, all substantially as and for the purpose herein set forth.

3. The combination of the adjustable slotted lever P with the end of the axis $c$ of the lever O operating the seed-slide, and with the adjustable tooth or pin W, revolving about the hub of the supporting-wheel D, all substantially in the manner and for the purpose herein set forth.

J. B. CONATY.
MILTON CATT.

Witnesses as to J. B. CONATY:
   DAVID A. BURR,
   E. A. DICK.
Witnesses as to MILTON CATT:
   CHAS. FISHER,
   WILSON CATT.